July 26, 1966 M. A. LAFER ETAL 3,263,140
TRIMMER CAPACITOR WITH DIRECT TRAVEL MECHANISM
Filed July 24, 1963
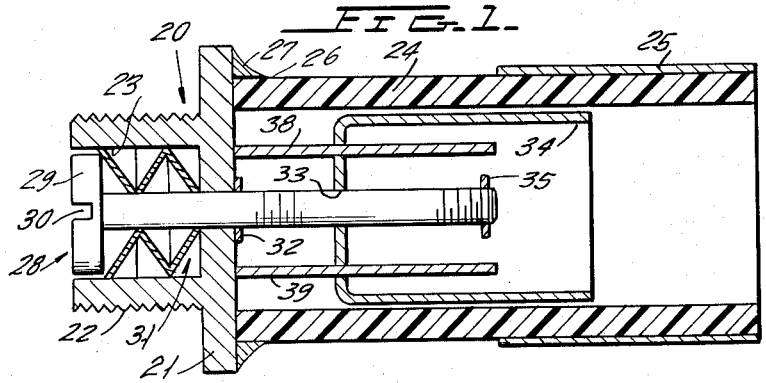
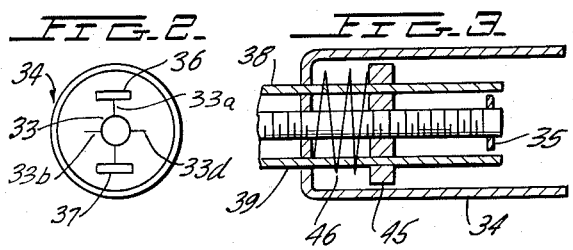
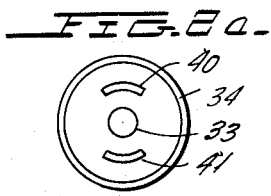
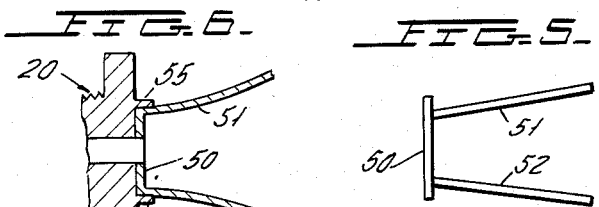
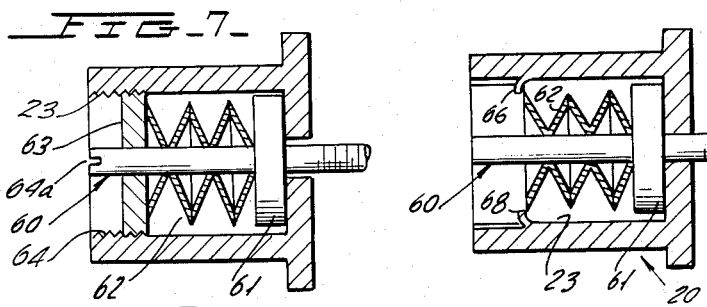
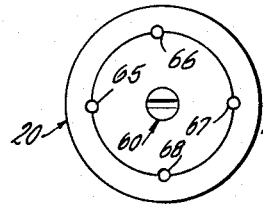
INVENTORS
MATTHEW A. LAFER
SAUL LEVINSON
BY
OSTROLENK, FABER, GERB & SOFFEN
ATTORNEYS

United States Patent Office 3,263,140
Patented July 26, 1966

3,263,140
TRIMMER CAPACITOR WITH DIRECT
TRAVEL MECHANISM
Matthew A. Lafer, Teaneck, N.J., and Saul Levinson, New
York, N.Y., assignors to JFD Electronics Corporation,
Brooklyn, N.Y., a corporation of New York
Filed July 24, 1963, Ser. No. 297,330
1 Claim. (Cl. 317—249)

This invention relates to a novel direct travel mechanism for trimmer capacitors, and more specifically relates to a novel direct travel mechanism wherein the piston is provided with openings which slidably receives extending members secured to the bushing.

Direct travel mechanisms for trimmer capacitors are known to the art and are shown, for example, in copending application Serial No. 183,512, filed March 29, 1962, entitled "Direct Travel Mechanism" in the name of Hugo Seiden and assigned to the assignee of the present invention. Such trimmer capacitors, when provided with direct travel mechanisms, become relatively expensive. The present invention provides a novel direct travel mechanism for trimmer capacitors which is relatively inexpensive and lends itself to mass production techniques.

Accordingly, a primary object of this invention is to provide a novel operating means for driving a piston within a dielectric cylinder without rotation of the piston.

Another object of this invention is to provide a novel direct travel mechanism for trimmer capacitors that is low in cost.

A still further object of this invention is to provide a novel direct travel mechanism for a trimmer capacitor which is easy to assemble.

Yet another object of this invention is to provide a novel direct travel mechanism for trimmer capacitors which provides good electrical contact between the piston and a terminal of the capacitor.

A still further object of this invention is to provide a novel direct mechanism for trimmer capacitors which provides pre-set drive screw-holding torques and is free of backlash.

A still further object of this invention is provide a novel trimmer capacitor which has precise reversal-free adjustment and is extremely reliable.

These and other objects of this invention will become apparent from the following description when taken in connection with the drawings, in which:

FIGURE 1 is a cross-sectional view of a trimmer capacitor adapted with the novel direct travel mechanism of the present invention.

FIGURE 2 is a side view of the piston of FIGURE 1.

FIGURE 2a illustrates a modified arrangement for the piston of FIGURE 2 wherein the piston guide rods are arcuate in cross-section.

FIGURE 3 is a view of a portion of the piston and control screw of FIGURE 1, and illustrates the manner in which an additional nut means can be provided for reception of a torque control bias means.

FIGURE 4 illustrates a stamping which may be used to form the piston guide rod.

FIGURE 5 schematically illustrates the manner in which the extending leg of the stamping of FIGURE 4 may be bent to define the guide rods and particularly illustrates the manner in which the rods normally diverge.

FIGURE 6 illustrates the manner in which the stamping of FIGURES 4 and 5 may be secured to the bushing of FIGURE 1, and further illustrates a different configuration for obtaining biasing force between the guide rods and piston.

FIGURE 7 illustrates an alternative manner in which the adjustment screw may be captured in the trimmer capacitor bushing.

FIGURE 8 shows a further arrangement for the capturing of the adjustment screw in the bushing.

FIGURE 9 is a side plan view of the bushing structure of FIGURE 8.

Referring now to FIGURE 1, we have illustrated therein a typical trimmer capacitor structure formed in accordance with the present invention which is comprised of a main bushing section 20 which has an extending flange portion 21 and a cylindrical portion having the thread 22 thereon. The cylindrical portion then has an opening 23 extending therein. The bushing 20 which is of any suitable metal then carries a dielectric bushing or cylinder 24 which could, for example, be of glass which has an electrode 25 on the right-hand end thereof. The left-hand end of cylinder 24 is then provided with a suitable conductive coating 26 which serves to receive a fillet of solder 27 to permit the soldering of cylinder 24 to the flange 21. Under appropriate circumstances, the left-hand end of cylinder 24 may be cemented to flange 21.

The flange portion 21 of bushing 20 is provided with a central opening which receives the shank of an adjustment screw 28 which has an extending head 29 which has a tool-receiving slot 30 therein.

A series of spring washers schematically illustrated by the spring washer 31 are then contained between head 29 of screw 28 and the left-hand surface of flange 21, as illustrated. A snap-ring, or other suitable retaining means such as snap-ring 32, is then secured to the shank of adjustment screw 28 and seats against the right-hand surface of flange portion 21 of bushing 20, whereby the screw 28 is rotatable, but is in a fixed longitudinal position. The threads of the shank of screw 28 then pass through a thread-receiving opening 33 in a piston 34 which could, for example, be drawn of some suitable low or matching thermal coefficient of expansion alloy material such as Invar. If desired, a special nut or screw-receiving means can be secured at the closed end of piston 34 for receiving adjustment screw 28, although it has been found satisfactory where a simple opening is formed in piston 2 which serves as a single thread-engaging nut.

Thus, as shown in FIGURE 2, the closed end of piston 2 will have an opening 33 therein which has cuts 33a through 33d extending therefrom to permit the formation of a single thread-engaging nut at the base of the piston. Any desired number of cuts may be used from one cut up to more than the number shown.

The end of adjustment screw 28 is then provided with a suitable stop means such as a retaining ring 35 which prevents the piston 34 from being threaded off adjustment screw 28.

In accordance with the present invention, and as shown in FIGURES 1 and 2, the piston 34 is then provided with openings 36 and 37 which receive guide rods 38 and 39 respectively which are suitably secured to the bushing 20. Guide rods 38 and 39 are of a suitable conductive material, and electrically connect piston 34 to bushing 20. The arrangement of the guide rods 38 and 39 may be of any suitable type and a specific arrangement will be shown more fully hereinafter with reference to FIGURES 4, 5 and 6.

The guide rods 38 and 39 of FIGURE 1 will have a rectangular cross-section, as indicated by openings 36 and 37 in FIGURE 2. Clearly, however, rods 38 and 39 may have other configurations such as an arcuate cross-section whereby the opening in the piston will have the form shown by openings 40 and 41 in FIGURE 2a. This type of arrangement would permit better use of the space within the dielectric cylinder, although the arrangement of FIGURE 2 is suitable.

In operation, the novel trimmer capacitor of FIGURES 1 and 2 will serve as a direct travel-type device wherein adjustment by rotation of screw 28 will cause the piston 34 to move along the axis of the device without rotation of the piston in view of the engagement of the guide rods 38 and 39 and the openings 36 and 37 in the piston.

Furthermore, it will be apparent that this novel direct engagement of the piston by the guide rods 38 and 39 will prevent backlash in the formed nut opening 33 without any other anti-backlash construction due to the unidirectional axial force of the guide rods on the piston which gives a unidirectional axial force of the piston on the screw.

Alternative to the arrangement of FIGURES 1 and 2, a separate anti-backlash sprung nut 45 may be threaded onto the adjustment screw 38, as illustrated. Clearly, nut 45 will have suitable openings therein for receiving guide rods 38 and 39 to prevent the nut 6 from rotating. Alternatively, the sprung nut 45 may be provided with suitable ears or lugs which slidably engage guide rods 38 and 39 to prevent the rotation thereof.

A compression spring 46 is then compressed during the assembly of the device, and is held in compression by the closed left-hand end of piston 34 and the anti-backlash nut 45. This assembly will eliminate backlash as described above for FIGURES 1 and 2, but will additionally serve to control the drive screw-holding torque.

FIGURES 4, 5 and 6 illustrate one manner in which the drive guide rods 38 and 39 could be economically formed. More specifically, a suitable metal stamping of, for example, a thin spring-steel may be formed of a central body 50 with extending legs 51 and 52. The assembly of FIGURE 4, when suitably stamped, may then be bent to the shape illustrated in FIGURE 5, whereby legs 51 and 52 serve the function of guide rods 38 and 39 in FIGURE 1. Clearly, an opening 53 is provided in the body section 50 to permit passage of the adjustment screw 28 in FIGURE 1.

This subassembly may then be secured to the right-hand surface of bushing 20, as illustrated in FIGURE 6, wherein the central disc portion 50 is crimped into the flat surface of bushing 20 as by crimps 54 and 55, or alternatively, disc portion 50 may be welded to the surface of bushing 20.

As has been previously indicated, the guide rod will be of rectangular or arcuate configuration wherein the width of the rod is preferably greater than its thickness to resist any tendency of the piston to turn or "windup" of the guide rod. Moreover, the guide rods are preferably flexible in the radial direction.

Thus, as indicated in FIGURE 5, when the extending sections 51 and 52 of the stamping of FIGURE 4 are bent to shape, they are bent to the divergent or convergent shape of FIGURE 5. During the assembly of the device, the legs 51 and 52 are biased inwardly so that they may be received by slots 36 and 37 in the piston (FIGURE 2), but their divergent natural position will cause the piston rods to bias themselves into engagement with the outer edge of their respective opening in piston 34. Therefore, the guide rods will take up any slack between the guide rods and their respective openings in the piston 34 for providing positive backlash-free guidance for the piston, as well as positive electrical contact to the piston.

Clearly, the divergent arrangement of legs 51 and 52 may have any desired configuration where, for example, FIGURE 6 illustrates legs 51 and 52 as being bent along a curved line. With this form of bend, the angle between the legs 51 and 52 and the piston at their point of contact will change less with variations in the axial location of the piston.

As indicated with reference to FIGURE 1, the drive screw 28, which may be of a material similar to the material of piston 34, is held in position by a snap-ring 32. The snap-ring 32 may, if desired, be a bowed snap-ring so that it can contribute to the drive screw holding torque particularly wherein an anti-backlash sprung nut is used for the piston, as shown in FIGURE 3. In this case, the spring washer 31 can be omitted.

Another manner in which the adjustment screw may be formed is illustrated in FIGURE 7 which shows the opening 23 in bushing 20 as receiving an adjustment screw 60 which has an extending shoulder 61 which seats against the interior end of opening 23. A suitable series of spring-type washers such as Belleville washers 62 are then loaded into opening 23, and a securing nut 63, which has the external surface thereof threaded, is then threaded into an internal thread 64 in opening 23 to compress the washers 62 against the left-hand surface of shoulder 21. The nut 63 then has an opening therein which passes the left-hand end of adjustment nut 60 so that a tool-receiving slot 64a is exposed for capacity adjustment operation.

FIGURES 8 and 9 illustrate an alternative manner for the securement of the washers 62 against shoulder 60 in FIGURE 7. Thus, in FIGURE 8 and 9, after the washers are loaded into opening 23, the outer interior end of opening 23 may be staked at stake portions 65 through 68 to hold spring 62 under a suitable pre-adjusted loading force. Note that a staking operation could also have been used in FIGURE 7 wherein the nut 63 is replaced by a simple washer with the staking securing the left-hand end of nut 63 in a predetermined position.

Although this invention has been described with respect to preferred embodiments thereof, it should be understood that many variations and modifications will now be obvious to those skilled in the art, and it is preferred therefore that the scope of this invention be limited not by the specific disclosure herein but only by the appended claim.

The embodiments of the invention in which an exclusive privilege or property is claimed are defined as follows:

A trimmer capacitor comprising, in combination, a conductive bushing, a dielectric cylinder secured to said bushing and extending from one surface thereof, a rotatable adjustment screw having one end captured in said conductive bushing and extending into said dielectric cylinder, an electrode on said dielectric cylinder, a conductive piston positioned within said dielectric cylinder and threadably connected to said adjustment screw, and a direct travel adjustment mechanism for moving said piston; said direct travel mechanism comprising a piston guide means composed of a metal stamping having a disk shaped central portion and first and second arms extending outwardly in opposite directions from one another from opposite peripheral portions of said central disk; said first and second arms bent substantially perpendicular to said disk and diverging slightly outwardly from one another; said central portion of said guide rod member secured to said bushing; said extending arms of said guide rod member symmetrically disposed on opposite sides of said adjustment screw; said piston having first and second openings in a wall thereof perpendicular to the axis of said piston; said first and second extending arms of said metal stamping extending through said first and second openings respectively; said extending arms preventing rotation of said piston with respect to said bushing when said adjustment screw is rotated; said outwardly diverging first and second arms biased into engagement with a side of their said respective first and second openings in said piston.

References Cited by the Examiner

UNITED STATES PATENTS

| | | | |
|---|---|---|---|
| 1,725,639 | 8/1929 | Herman | 317—251 |
| 3,051,879 | 8/1962 | Lazar | 317—249 |
| 3,071,716 | 1/1963 | Young | 317—249 |
| 3,090,243 | 4/1963 | Barnes | 317—249 |
| 3,166,695 | 1/1965 | Barnes | 317—249 |

FOREIGN PATENTS 774,346  12/1934  France.

LARAMIE E. ASKIN, *Primary Examiner.*

JOHN F. BURNS, *Examiner.*

E. GOLDBERG, *Assistant Examiner.*